United States Patent Office 3,069,115
Patented Dec. 18, 1962

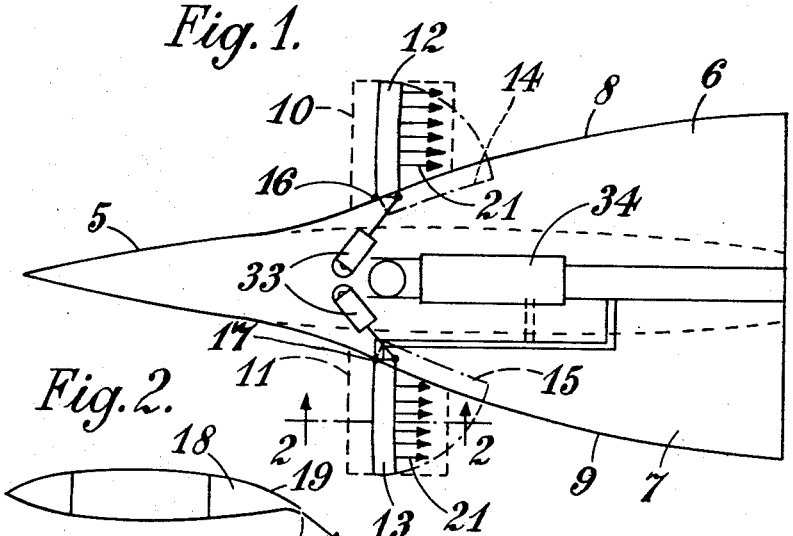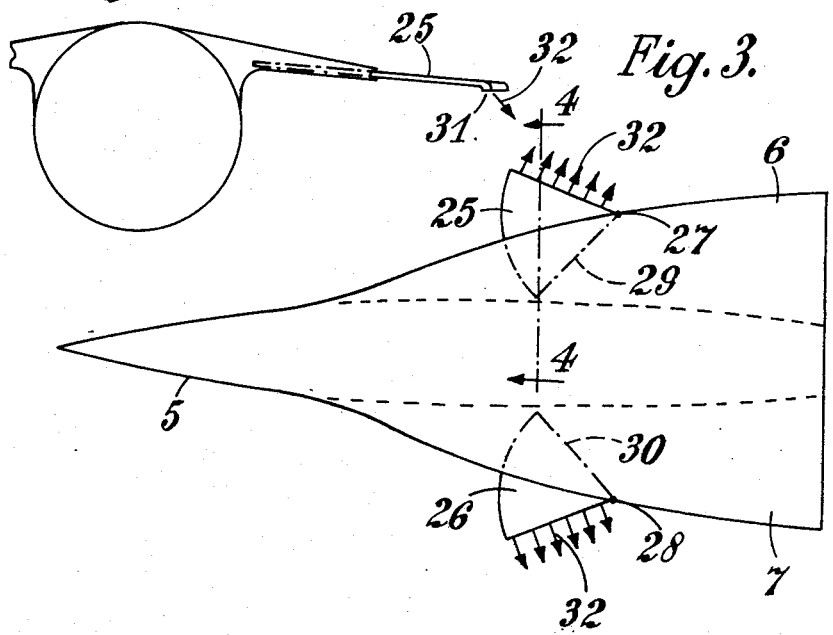
INVENTOR
WILLIAM JOHN STRANG
BY McKinney & McKinney
ATTYS.

3,069,115
AIRCRAFT
William John Strang, Bristol, England, assignor to Bristol Aircraft Limited, Bristol, England, a company of Great Britain
Filed Oct. 7, 1959, Ser. No. 844,892
Claims priority, application Great Britain Oct. 8, 1958
3 Claims. (Cl. 244—42)

This invention relates to aircraft.

According to one aspect of the invention there is provided an aircraft comprising, a body, a source of pressure fluid within the body and at least one member having a nozzle means at its trailing edge from which a sheet of fluid at high velocity can be expelled, said member being connected to receive fluid under pressure from said source and being connected to the said body for movement between a retracted position and a projected position, in which projected position the member will, during flight, be swept by the relative airstream passing over the aircraft. Preferably the member is in the form of an aerofoil. Preferably the aerofoil is pivoted to the body to pivot between the retracted position and the projected position.

Preferably the aircraft further comprises a housing in which the aerofoil is received in its retracted position.

In an aircraft having a pair of wings, at least two aerofoils are provided, one pivoted to each wing.

According to another aspect of the invention there is provided an aircraft including a source capable of supplying gaseous medium under greater than atmospheric pressure, a hollow member which is projectible and retractable into and from a position in which during flight it will be swept by the relative airstream passing the aircraft and which when so projected is connected or connectible to receive gaseous medium from said source, the member having a elongated nozzle means for the discharge of the gaseous medium into the atmosphere, the shape of the member and the position of the nozzle means being such that, when during flight the member is in its projected position and gaseous medium is being discharged from the slot, a force is produced upon the aircraft having a component transverse to the direction of flight greater than the reaction upon the member of the discharged gaseous medium. The nozzle means may be in the form of a slot or in the form of a plurality of holes arranged in a line along or near the trailing edge of the hollow body.

Two embodiments of the invention are illustrated by way of example in the accompanying drawings in which:

FIGURES 1 and 3 each show, diagrammatically and in plan view, different aircraft according to the invention, intended for flight at supersonic speed, FIGURE 2 is a cross section taken along the line 2—2 in FIGURE 1, and FIGURE 4 is a cross section taken along the line 4—4 in FIGURE 3.

The aircraft shown in FIGURE 1 comprises a pointed body 5 including a pair of low aspect ratio wings 6, 7 having sharply swept back leading edges 8, 9. For take off and landing it is necessary or desirable to provide auxiliary lift at a region well forward along the main lifting surfaces. To obtain desired take-off and landing characteristics it would be desirable to provide auxiliary conventional aerofoils of about the dimensions and positions shown by the dotted lines 10, 11, but the construction of such aerofoils for retraction into the aircraft would be a very difficult problem. The difficulty is overcome according to the invention by providing a pair of aerofoils 12, 13 having nozzle means at their trailing edges through each of which nozzle means a sheet of gas may be expelled at high velocity. These aerofoils 12, 13 would be of substantially smaller size than the conventional aerofoils and are arranged to be projectible from housings 14, 15 in the leading edges of the wings 6, 7 into the positions shown in full lines. For this purpose the aerofoils 11, 12 pivoted to the wings at their leading edges by pivots 16, 17 and are moved by suitable servo devices 33. The aerofoils 11, 12 are of hollow construction (see FIGURE 2) providing cavities 18 extending spanwise adjacent their trailing edges 19, these trailing edges being formed to provide nozzle means in the form of slots 20 through which a sheet of air or exhaust gas from a power plant 34 in the aircraft may be discharged in a downward and rearward direction as indicated by arrows 21. By this means a sufficiently high lift may, be produced on the aerofoils 11, 12 to compensate for their reduced size.

FIGURE 3 shows a generally similar form of aircraft but in this example the aerofoils from which the sheet of air is expelled take the form of sector shaped flaps 25, 26 which turn about pivots 27, 28 at their rear ends to enter or leave housings 29, 30 in the wings 6, 7. The flaps 25, 26 are provided with slots 31 along their outer edges through which a sheet of air or exhaust gas may be discharged in a downward, outward and rearward direction as indicated by the arrows 32.

In either of the examples the aerofoils from which a sheet of air is expelled may be used for the purpose of directional or rolling control by varying the rate of discharge of air or gas from the slots.

The nozzle means may also be in the form of a plurality of holes arranged in a line along or near the trailing edge of the hollow body.

A number of aerofoils from which a sheet of air is expelled are described and/or shown in a paper entitled "The Jet Flap" by Mr. I. M. Davidson published in the Journal of the Royal Aeronautical Society of January 1956 and are therein referred to as jet flapped wings or aerofoils. In this paper the operation and characteristics of the aerofoils described are indicated in some detail.

I claim:

1. An aircraft comprising a fuselage having mounted thereon wings with sharply swept-back leading edges, auxiliary lift surfaces pivotally mounted well forward of the aircraft on said leading edges of the wings about substantially vertical axes for pivotal movement between a retracted position within the wings and an extended position in which the lift surfaces extend forwardly of the leading edges of the wings and project laterally of the aircraft into the airstream, and a source of pressure fluid, said lift surfaces having downwardly facing nozzle means which are connected to receive pressure fluid from said source, the pressure fluid being expelled downwardly from the nozzle means at high velocity in laterally-extending sheet form to provide an effect equivalent to additional lift surfaces for the aircraft.

2. An aircraft comprising a fuselage having mounted thereon wings of delta planform with sharply swept-back leading edges, two auxiliary lift members of elongated form and of aerofoil cross-section, which members are mounted in the leading edges of the respective wings well forward on the aircraft for pivotal movement about vertical axes between a retracted position within the wings and an extended position in which the members project laterally of the aircraft and extend forwardly of the leading edges of the wings, and a source of pressure fluid, the members having trailing edges formed with nozzles which in the extended position of the members face downwardly-and-rearwardly and which are connected to be supplied with pressure fluid from said source, the pressure fluid being expelled downwardly and rearwardly from the nozzles at high velocity in laterally-extending sheet form to provide an effect equivalent to additional lift surfaces for the aircraft.

3. An aircraft comprising a fuselage having mounted thereon wings of delta planform with sharply swept-back leading edges, two auxiliary lift members of elongated form and of aerofoil cross-section, which members are mounted in the leading edges of the respective wings well forward on the aircraft for pivotal movement about vertical axes extending through the ends of the members further from the fuselage between a retracted position within the wings and an extended position in which the members project laterally away from the fuselage and extend forwardly of the leading edges of the wings, and a source of pressure fluid, the members having trailing edges formed with nozzles which in the extended position of the members face downwards, rearwards, and laterally-outwards from the fuselage and which are connected to be supplied with pressure fluid from said source, the pressure fluid being expelled downwards, rearwards and laterally-outwards from the nozzles at high velocity in laterally-extending sheet form to provide an effect equivalent to additional lift surfaces for the aircraft.

References Cited in the file of this patent

UNITED STATES PATENTS

| | | |
|---|---|---|
| 1,606,117 | Caples | Nov. 9, 1926 |
| 2,406,924 | Stalker | Sept. 3, 1946 |
| 2,929,582 | Munro | Mar. 20, 1960 |
| 2,941,751 | Gagarin | June 21, 1960 |
| 2,941,752 | Gluhareff | June 21, 1960 |

FOREIGN PATENTS

| | | |
|---|---|---|
| 856,763 | France | Apr. 1, 1940 |
| 1,103,426 | France | May 25, 1955 |